United States Patent [19]
Peng

[11] Patent Number: 5,349,800
[45] Date of Patent: Sep. 27, 1994

[54] CEILING FRAME JOINT STRUCTURE

[76] Inventor: Sen-Ming Peng, No 5, Lane 46, Cheng Kung Street, Hsin-Pu, Hsinchu Hsien, Taiwan

[21] Appl. No.: 49,765

[22] Filed: Apr. 19, 1993

[51] Int. Cl.⁵ .............................................. E04B 5/52
[52] U.S. Cl. .................... 52/506.06; 52/506.07; 52/665; 52/483.1; 403/174; 403/403
[58] Field of Search ............... 52/665, 666, 664, 657, 52/702, 652.1, 378, 506.07, 506.06, 483.1; 403/217, 218, 219, 174, 173, 178, 232.1, 403; 248/343, 300

[56] References Cited

U.S. PATENT DOCUMENTS

| | | | |
|---|---|---|---|
| 1,524,808 | 2/1925 | Barry | 52/378 |
| 2,474,727 | 6/1949 | Denier | 403/173 |
| 2,676,483 | 4/1954 | Nelsson | 248/300 |
| 3,256,030 | 6/1966 | Banse | 52/665 |
| 3,590,544 | 7/1971 | Shepherd | 52/573 |
| 3,835,614 | 9/1974 | Downing, Jr. | 52/484 |
| 4,421,434 | 12/1983 | Magner | 403/403 |
| 4,485,605 | 12/1984 | LaLonde | 52/665 |
| 4,525,971 | 7/1985 | Kern | 52/484 |
| 4,570,391 | 2/1986 | Quante et al. | 52/665 |
| 4,843,791 | 7/1989 | Michlovic | 52/467 |

FOREIGN PATENT DOCUMENTS 2408923 9/1975 Fed. Rep. of Germany .

*Primary Examiner*—Carl D. Friedman
*Assistant Examiner*—Winnie Yip
*Attorney, Agent, or Firm*—Poms, Smith, Lande & Rose

[57] ABSTRACT

A ceiling frame joint structure comprises a first member and a second member each of which is in the form of an elongated, downward-facing U-shaped channel defined by a top wall and two opposite side walls to receive therein a portion of a bar member which constitutes the ceiling frame. Each of the first and second members comprises a middle section interposed between two opposite end sections and the side walls of the middle sections are removed to form notches which have such a size that the second member is receivable within the notches of the first member in an orthogonal manner to have the top wall thereof crossly overlapped under the top wall of the first member. A fastener penetrates through holes formed on the middle sections of the top walls to secure the two members together. Holes are provided on the side walls of both members to allow nails or screws to penetrate into the bar member received within the channels to secure the bar members within the first and the second members.

16 Claims, 5 Drawing Sheets

CEILING FRAME JOINT STRUCTURE

FIELD OF THE INVENTION

The present invention relates generally to a frame joint structure and in particular to a ceiling frame joint structure.

BACKGROUND OF THE INVENTION

In indoor decoration, ceiling is an important part used to cover the rough, ugly concrete floor structure of the upstairs. One way to secure the ceiling under a concrete floor structure is to form a ceiling frame in a lattice form with elongated bars. Ceiling plates are then attached on the frame to complete the construction of the ceiling. For general houses or general purpose buildings, the ceiling frame is usually constituted by wooden bars for being easy to handle. Nails or screws are required to secure the wooden bars together to form the lattice frame and to fix the frame under the concrete floor structure.

Since nails or screws are used to fix the bars together, the strength of the ceiling frame is definitely dependent upon the use and number of the nails or screws. However, for a large frame, a carpenter may not be able to control the final quality of each joint of the frame. Namely, the nailing and structural strength may be variable from a joint to another. This leads in defects or faults in the overall strength of the frame for supporting the ceiling plates and other ornaments thereon and as a consequence, under a great load, the ceiling may crack and rend and even falling down.

It is therefore desirable to provide a standardized frame joint which provides a unified joint quality for securing bar members together to form the frame structure so as to avoid local defects or faults which may eventually lead in an overall crush of the frame.

SUMMARY OF THE INVENTION

It is therefore a primary object of the present invention to provide a standardized ceiling frame joint structure which facilitates the connection of frame bar members and provides an unified joint quality over the entire frame structure.

It is another object of the present invention to provide a ceiling frame joint structure which provides a uniform joint strength over the entire frame structure.

It is also an object of the present invention to provide a ceiling frame joint structure which allows a worker to calculate in advance the quantity of all materials or parts used to construct a ceiling in a given room or indoor space.

It is a further object of the present invention to provide a ceiling frame joint structure which comprises a cruciform joint for an interior jointing point, a T-shape joint for a side jointing point and an L-shaped joint for a corner jointing point.

It is a further object of the present invention to provide a ceiling frame joint structure which comprises two members which have a clearance therebetween to allow the members to move with respect to each other and thus providing positioning adjustment thereof to facilitate the installation thereof.

To achieve the above-mentioned objects, there is provided a ceiling frame joint structure which comprises a first member and a second member each of which is in the form of an elongated, downward-facing U-shaped channel defined by a top wall and two opposite side walls to receive therein a portion of a bar member which constitutes the ceiling frame. Each of the first and second members comprises a middle section interposed between two opposite end sections and the side walls of the middle sections are removed to form notches which have such a size that the second member is receivable within the notches of the first member in an orthogonal manner to have the top wall thereof crossly overlapped under the top wall of the first member. A fastener penetrates through holes formed on the middle sections of the top walls to secure the two members together. Holes are provided on the side walls of both members to allow nails or screws to penetrate into the bar member received within the channels to secure the bar members within the first and the second members.

BRIEF DESCRIPTION OF THE DRAWINGS

The above and other objects and advantages of the present invention will be readily apparent from the following description of preferred embodiments taken in connection with the accompanying drawings, wherein.

DETAILED DESCRIPTION OF THE PREFERRED EMBODIMENT

Figure 1:
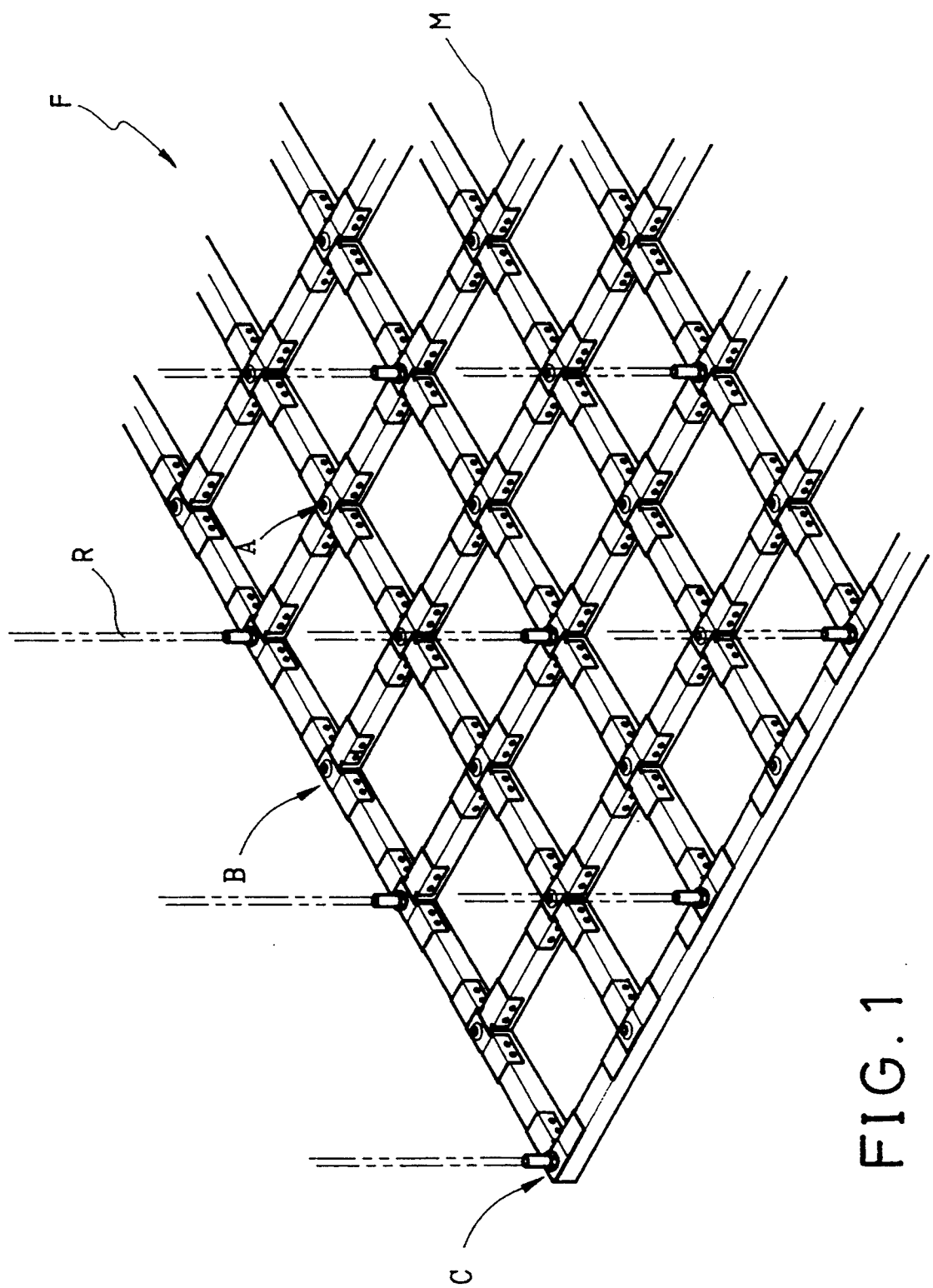
FIG. 1 is a perspective view showing a ceiling frame constructed by bar members which are connected together by joints made in accordance with the present invention.

With reference to the drawings and in particular to FIG. 1, wherein a ceiling frame, generally designated by F, is shown, the ceiling frame F is constructed by a number of bar members M jointed at joints which comprises three different types, namely interior joint A, side joint B and corner joint C. The example shown in FIG. 1 illustrates only one of many possible arrangements of the bar members and the joints A, B and C. Other arrangements which are not illustrated in the drawings are quite apparent to those skilled in the art of building construction.

Figure 2:
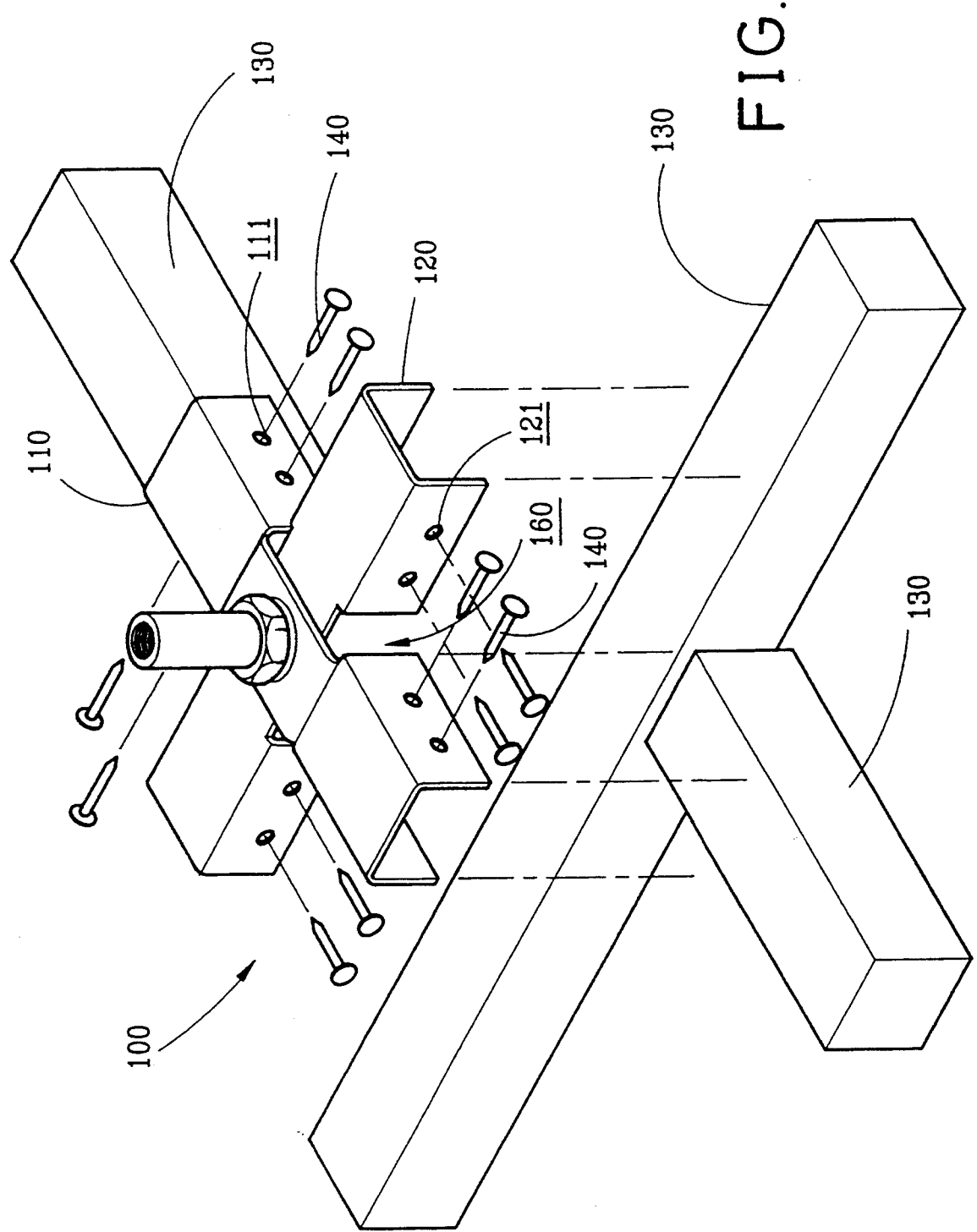
FIG. 2 is a partially exploded view showing a first embodiment of the present invention which is a cruciform joint structure connecting ceiling frame bar members at an interior jointing point.
Figure 3:
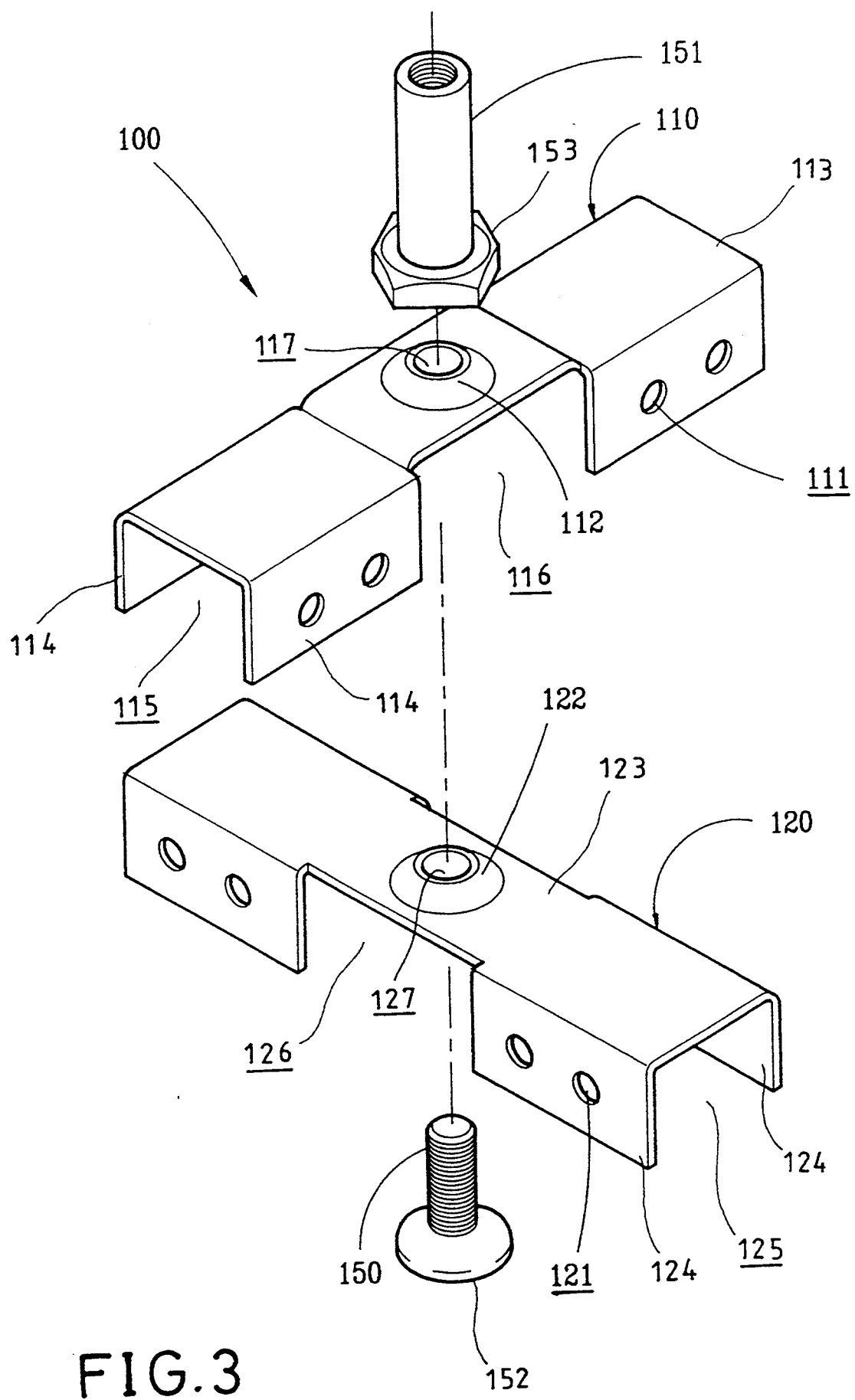
FIG. 3 is an exploded view showing the structure off,the first embodiment of the present invention.

The joints A, B and C which are used to form the ceiling frame F are the subject invention of this application and will be further discussed hereinafter. The detailed structure of joint A of the instant invention is illustrated in FIGS. 2 and 3 and a description thereof will be given in the next paragraphs. Thereafter, the joints B and C of the instant invention which share certain similarity with the joint A will be described. Similar portions between joints A, B and C will not be described again to shorten the description.

With reference to FIGS. 2 and 3, where the joint A is illustrated in detail, the joint A which is also designated with the reference numeral 100 in these figures for description comprises a structure constituted by a first member 110 and a second member 120. Each of the first and second member 110 and 120 has a U-shaped cross section comprising a top wall 113 or 123 with two opposite side walls 114 or 124 depending therefrom to define a length of U-shaped, downward-facing channel 115 or 125.

Each of the first and second members 110 and 120 is divided into a middle section interposed between two end sections along the length thereof. On the middle section of each of the side walls 114 of the first member 110, a notch 116 is formed with a size large enough to receive therein the second member 120 in an orthogonal manner. The notches 116 are formed in such a way to allow the top wall 123 of the second member 120 to be crossly overlapped by the top wall 113 of the first member 110 so as to form a cruciform joint as shown in FIG. 2.

It is also possible to provide a similar notch 126 on each of the side walls 124 of the second member 120. To provide a continuous inner surface of the top wall 113 of the first member 110, the top wall 113 of the first member 110 may be machined to form a slight upward recess corresponding to the locations of the notches 116 and having a depth substantially equal to the thickness of the top wall 123 of the second member 120 to completely receive the top wall 123 of the second member 120 therein so that when the second member 120 is received within the notches 116 of the first member 110 and the top wall thereof is overlapped under the top wall 113 of the first member 110, the unrecessed portion of the top wall 113 of the first member 110 and the portion of the top wall 123 of the second member 120 which is received within the recessed portion of the top wall 113 of the first member 110 constitute a continuous plane.

The bar members which are designated M in FIG. 1 are now designated with reference numeral 130 in FIGS. 2 and 3. The bar members 130 are machined to have a cross section complementary to the channels 115 and 125 and are thus receivable therein. Nail holes 111 are provided on the side walls 114 of the first member 110 and similar nail holes 121 are formed on the side walls 124 of the second member 120. There are preferably four nail holes 111 or 112 formed on each of the side walls 114 and 124 of the first and second members 110 and 120. To be symmetric, there are two holes 111 or 121 formed on each end section of the side walls 114 or 124 and thus four holes in total are provided on each of the side walls.

The nail holes 111 and 121 allow nails 140 (FIG. 2) or the like, such as screws, to penetrate into the bar members 130 received within the channels 115 and 125 of the first and second members 110 and 120 and thus securing the bar members 130 within the first and second members 110 and 120.

Fastener means, such as a bolt 150, is provided to secure the first and second members 110 and 120 together. The bolt 150 extends through a hole 127 formed on the middle section of the top wall 123 of the second member 120 and a corresponding hole 117 formed on the middle section of the top wall 113 of the first member 110 and project out of the second top wall 113 to be threadingly engaged by a nut member 153. To accommodate the screw head 152, an indentation 122 is formed on the middle section of the top wall of the second member 120, around the hole 127 thereof, and a corresponding indentation 112 is formed on the middle section of the top wall of the first member 110, around the hole 117 thereof. The indentations 112 and 122 overlap each other when the second member 120 is secured to the first member 110 to provide a space for completely receiving the screw head 152 therein without interference with the receipt of the bar members 130 within the channels 115 and 125.

Preferably, the nut member 153 is provided with an elongated extension 151 having an inner thread 151 to engage a hanging rod R (FIG. 1) depending from the concrete floor structure.

It is desirable to have the notches 116 and 126 have a size slightly larger than the cross-sectional dimension of the first and second members 110 and 120 so that when the two members 110 and 120 are connected together in an orthogonal fashion to form a joint, a clearance 160 (FIG. 2) is provided between the two members 110 and 120 to allow the two members 110 and 120 to be slightly rotatable with respect to each other so that adjustment of the orientations of the two members 110 and 120 can be conducted to accommodate the slightly mis-alignment of the ceiling frame structure during construction.

Figure 4:
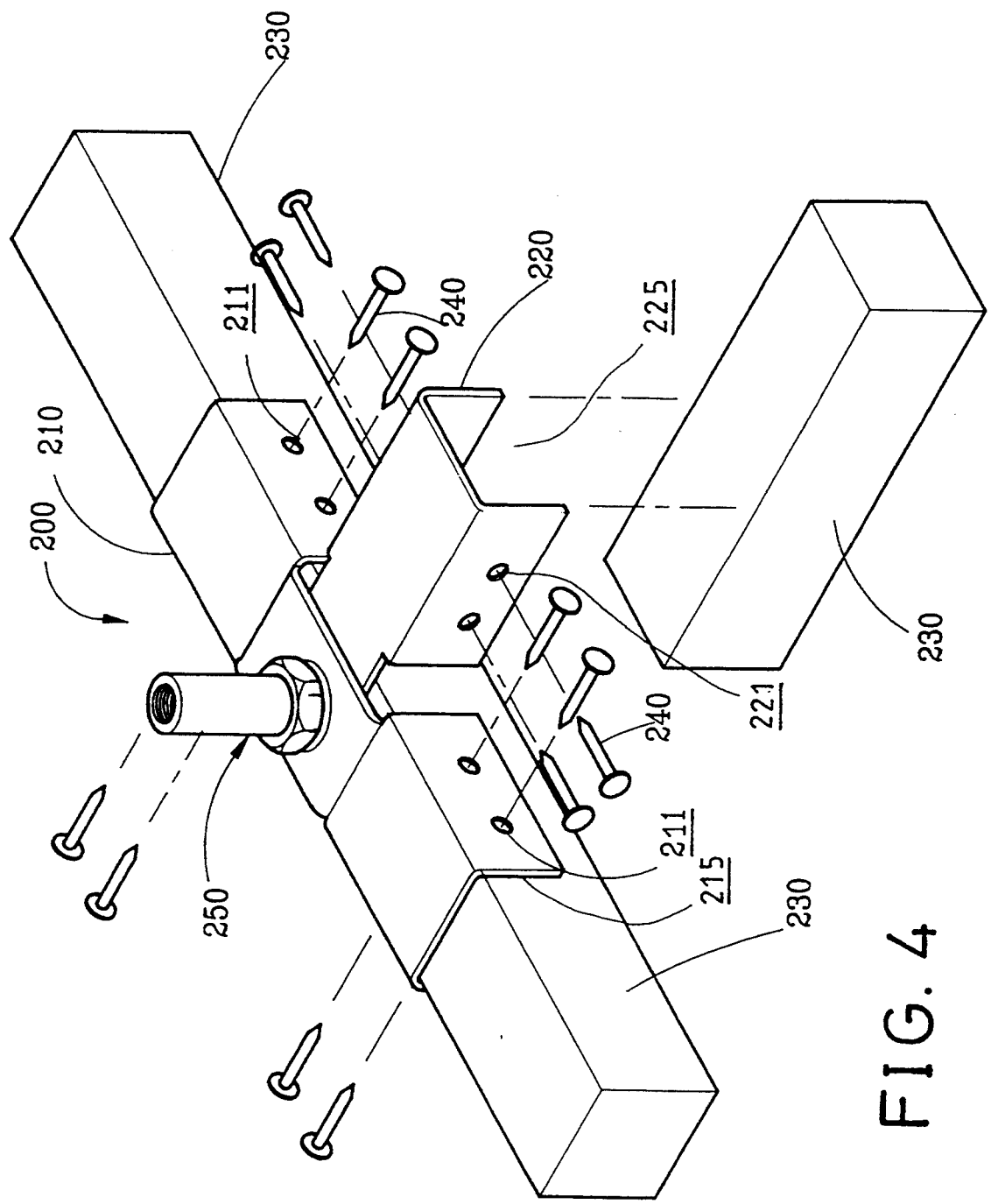
FIG. 4 is a view similar to FIG. 2, but showing a second embodiment of the present invention which is a T-shaped joint used at a side jointing point.

With particular reference to FIG. 4, wherein a second embodiment of the present invention is shown, the embodiment of FIG. 4 illustrates a side joint structure which is designated by letter B in FIG. 1. The side joint which is now represented by the reference numeral 200 comprises a first member 210 and a second member 220 as the first embodiment shown in FIGS. 2 and 3. However, to meet the boundary requirement, an end section of the second member 220 is cut off so that when the second member 220 is secured to the first member 210, a T-shaped joint structure is formed. Similar to the cruciform joint structure 100 described with reference to FIGS. 2 and 3, the first and second members 210 and 220 of the T-shaped joint structure 200 define channels 215 and 225 for receiving therein the bar members which are now designated by numeral 230 in FIG. 4. Nail holes 211 and 221 are similarly provided on the first member 210 and the second member 220 to allow nails or screws 240 to penetrate into the bar members 230 so as to secure the bar members 230 within the channels 215 and 225. The securing together of the first member 210 and the second member 220 is similarly done by a threaded fastener 250 in the same way as that described in the cruciform joint 100.

Figure 5:
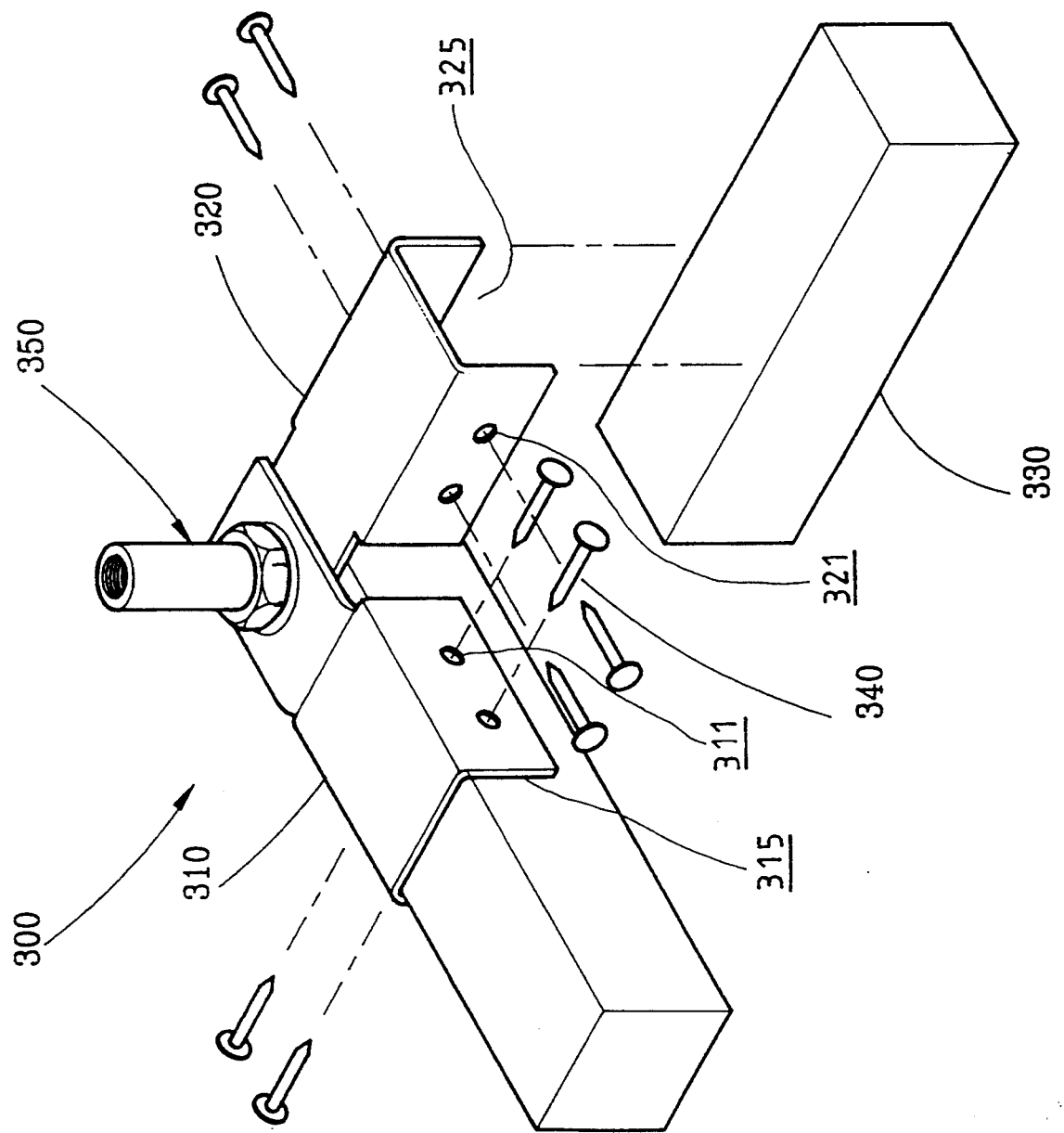
FIG. 5 is a view similar to FIGS. 2 and 4, but showing a third embodiment of the present invention which is an L-shaped joint used at a corner jointing point.

With particular reference to FIG. 5, wherein a third embodiment of the present invention is shown, the embodiment of FIG. 5 illustrates a corner joint structure which is designated by letter C in FIG. 1. The corner joint which is now represented by the reference numeral 300 also comprises a first member 310 and a second member 320 as the first embodiment shown in FIGS. 2 and 3 and the second embodiment shown in FIG. 4. However, to meet the boundary requirement, both the first and the second members 310 and 320 have an end section removed so that when the second member 320 is secured in the first member 310 in an orthogonal fashion, an L-shaped joint structure is formed. Similar to the cruciform joint structure 100 described with reference to FIGS. 2 and 3 and the T-shaped joint structure illustrated in FIG. 4, the first and second members 310 and 320 of the L-shaped joint structure 300 define channels 315 and 325 for receiving therein the bar members which are now designated by numeral 330 in FIG. 5. Nail holes 311 and 321 are similarly provided on the first member 310 and the second member 320 to allow nails or screws 340 to penetrate into the bar members 330 so as to secure the bar members 330 within the channels 315 and 325. The securing together of the first member 310 and the second member 320 is similarly done by a threaded fastener 350 in the same way as that described in the cruciform joint 100 and the T-shaped joint 200.

It is apparent that although the invention has been described in connection with the preferred embodiments, it is contemplated that those skilled in the art may make changes to certain features of the preferred embodiments without altering the basic concept of the invention and without departing from the spirit and scope of the invention as defined in the appended claims.

What is claimed is:

1. A ceiling frame joint kit for connecting ceiling bars, the joint kit comprising:
   a first joint member including a pair of substantially U-shaped channel portions, each channel portion adapted to receive a ceiling bar and each having a pair of side walls and a connecting wall arranged between the side walls, and a substantially planar portion arranged substantially between the connecting walls to define a first notch transversely between the chapel portions;
   a second joint member, separate and apart from the first joint member, including a pair of substantially U-shaped channel portions, each channel portion adapted to receive a ceiling bar and each having a pair of side walls and a connecting wall arranged between the side walls, and a substantially planar portion arranged substantially between the connecting walls to define a second notch transversely between the channel portions:
   a joint fastener for securing the first joint member to the second joint member such that the first and second joint members are offset approximately 90° from one another; and
   at least one bar fastener for securing a ceiling bar received by one of the respective channel portions of the first and second joint members;
   wherein the first notch defines a distance sufficient to allow the second joint member to be adjusted relative to the first joint member when the first and second joint members am in an assembled state.

2. A ceiling frame joint kit as claimed in claim 1, wherein the substantially planar portions of the first and second joint members each include an aperture and the joint fastener comprises a nut and bolt arrangement.

3. A ceiling frame joint kit as claimed in claim 2, wherein the nut comprises an upward extension adapted to engage a hanging rod.

4. A ceiling frame joint kit as claimed in claim 3, wherein the extension comprises an inner threaded hole adapted to engage a threaded portion of the hanging rod.

5. A ceiling frame joint kit as claimed in claim 2, wherein the bolt comprises a head portion and the planar portions of the first and second joint members each comprise an indentation formed around their respective apertures, the indentation formed on the second joint member adapted to receive the head portion of the bolt.

6. A ceiling frame joint kit as claimed in claim 1, wherein at least one of the side walls of each of the first and second joint members comprises at least one aperture and the at least one bar fastener comprises at least one sharpened slender member.

7. A ceiling frame joint kit as claimed in claim 6 wherein the at least one sharpened slender member comprises a nail.

8. A ceiling frame joint kit as claimed in claim 6 wherein the at least one sharpened slender member comprises a screw.

9. A ceiling frame joint kit as claimed in claim 1, wherein connecting wall of the second joint member defines a predetermined thickness and the planar portion of the first joint member is offset from the connecting walls of the first joint member such that the planar portion and connecting walls of the first joint member define a recess having a depth substantially equal the predetermined thickness.

10. A ceiling frame joint kit for connecting ceiling bars, the joint kit comprising:
    a first joint member including a pair of substantially U-shaped channel portions, each channel portion adapted to receive a ceiling bar and having a pair of side walls and a connecting wall arranged between the side walls, and a substantially planar portion arranged substantially between the connecting walls to define a notch transversely between the channel portions:
    a second joint member, separate and apart from the first joint member, including a substantially U-shaped channel portion adapted to receive a ceiling bar, the U-shaped channel portion having a pair of side walls and a connecting wall arranged between the side walls, and a substantially planar portion adjacent the connecting wall;
    a joint fastener for securing the first joint member to the second joint member such that the first and second joint members are offset approximately 90° from one another; and
    at least one bar fastener for securing a bar received by one of the respective channel portions of the first and second joint members;
    wherein the notch defines a distance sufficiently to allow the second joint member to be adjusted relative to the first joint member when the first and second joint members are in an assembled state.

11. A ceiling frame joint kit as claimed in claim 10, wherein the substantially planar portions of the first and second joint members each include an aperture and the joint fastener comprises a nut and bolt arrangement.

12. A ceiling frame joint kit as claimed in claim 11, wherein the nut comprises an upward extension adapted to engage a hanging rod.

13. A ceiling frame joint kit as claimed in claim 12, Wherein the extension comprises an inner threaded hole adapted to engage a threaded portion of the hanging rod.

14. A ceiling frame joint kit as claimed in claim 11, wherein the bolt comprises a head portion and the planar portions of the first and second joint members each comprise an indentation formed around their respective apertures, the indentation formed on the second joint member adapted to receive the head portion of the bolt.

15. A ceiling frame joint kit as claimed in claim 10, wherein at least one of the side walls of each of the first and second joint members comprises at least one aperture and the at least one bar fastener comprises at least one sharpened slender member.

16. A ceiling frame joint kit as claimed in claim 10, wherein connecting wall of the second joint member defines a predetermined thickness and the planar portion of the first joint member is offset from the connecting walls of the first joint member such that the planar portion and connecting walls of the first joint member define a recess having a depth substantially equal the predetermined thickness.

* * * * *